United States Patent
Wang et al.

(10) Patent No.: US 10,817,708 B2
(45) Date of Patent: Oct. 27, 2020

(54) FACIAL TRACKING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Chengjie Wang, Shenzhen (CN); Hui Ni, Shenzhen (CN); Yandan Zhao, Shenzhen (CN); Yabiao Wang, Shenzhen (CN); Shouhong Ding, Shenzhen (CN); Shaoxin Li, Shenzhen (CN); Ling Zhao, Shenzhen (CN); Jilin Li, Shenzhen (CN); Yongjian Wu, Shenzhen (CN); Feiyue Huang, Shenzhen (CN); Yicong Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 49 days.

(21) Appl. No.: 16/297,565

(22) Filed: Mar. 8, 2019

(65) Prior Publication Data
US 2019/0205623 A1   Jul. 4, 2019

Related U.S. Application Data (63) Continuation of application No. PCT/CN2017/112059, filed on Nov. 21, 2017.

(30) Foreign Application Priority Data

Dec. 8, 2016  (CN) .......................... 2016 1 1121387

(51) Int. Cl.
   *G06K 9/00*         (2006.01)

(52) U.S. Cl.
   CPC ..... *G06K 9/00288* (2013.01); *G06K 9/00261* (2013.01); *G06K 9/00281* (2013.01); *G06K 9/00711* (2013.01)

(58) Field of Classification Search
   CPC .......... G06K 9/00288; G06K 9/00261; G06K 9/00281; G06K 9/00711; G06K 9/00248;
   (Continued)

(56) References Cited

U.S. PATENT DOCUMENTS

| | | | | |
|---|---|---|---|---|
| 7,801,337 B2 * | 9/2010 | Akahori | ............. | G06K 9/00281 382/118 |
| 8,254,647 B1 * | 8/2012 | Nechyba | ............. | G06K 9/00248 382/118 |

(Continued)

FOREIGN PATENT DOCUMENTS

| CN | 104036240 A | 9/2014 |
|---|---|---|
| CN | 104156438 A | 11/2014 |

(Continued)

OTHER PUBLICATIONS

The World Intellectual Property Organization (WIPO) International Search Report for PCT/CN2017/112059 dated Feb. 23, 2018 6 Pages (including translation).

(Continued)

*Primary Examiner* — Michael S Osinski
(74) *Attorney, Agent, or Firm* — Anova Law Group, PLLC (57) ABSTRACT

A facial tracking method is provided. The method includes: obtaining, from a video stream, an image that currently needs to be processed as a current image frame; and obtaining coordinates of facial key points in a previous image frame and a confidence level corresponding to the previous image frame. The method also includes calculating coordinates of facial key points in the current image frame accord- (Continued)

ing to the coordinates of the facial key points in the previous image frame when the confidence level is higher than a preset threshold; and performing multi-face recognition on the current image frame according to the coordinates of the facial key points in the current image frame. The method also includes calculating a confidence level of the coordinates of the facial key points in the current image frame, and returning to process a next frame until recognition on all image frames is completed.

20 Claims, 5 Drawing Sheets

(58) Field of Classification Search
CPC ........... G06K 9/00268; G06K 9/00255; G06K 9/00677; G06K 9/00912; G06K 9/6211; G06K 9/6215; G06K 9/00208; G06K 9/00234; G06K 9/00295; G06K 9/00744; G06K 9/00771; G06K 2209/21; H04N 5/23219; H04N 5/232; H04N 5/23293; G06T 2207/30201; G06T 2207/10016
See application file for complete search history.

(56) References Cited

U.S. PATENT DOCUMENTS

| | | | | |
|---|---|---|---|---|
| 8,649,604 | B2* | 2/2014 | Steinberg | G06K 9/00228 |
| | | | | 382/118 |
| 10,083,343 | B2* | 9/2018 | Suh | G06K 9/6278 |
| 2004/0165754 | A1* | 8/2004 | Tabata | G06K 9/00228 |
| | | | | 382/118 |
| 2007/0188644 | A1* | 8/2007 | Okamoto | H04N 5/23222 |
| | | | | 348/333.01 |
| 2008/0192122 | A1* | 8/2008 | Izawa | H04N 5/23219 |
| | | | | 348/207.99 |
| 2012/0213420 | A1* | 8/2012 | Steiner | G06K 9/00926 |
| | | | | 382/118 |
| 2012/0213490 | A1* | 8/2012 | Steiner | G06K 9/00268 |
| | | | | 386/241 |
| 2013/0222632 | A1* | 8/2013 | Okamoto | H04N 5/23219 |
| | | | | 348/222.1 |
| 2013/0259381 | A1* | 10/2013 | Srinivasan | G06K 9/00771 |
| | | | | 382/192 |
| 2015/0117786 | A1* | 4/2015 | James | G06F 16/51 |
| | | | | 382/195 |
| 2016/0283820 | A1* | 9/2016 | Shen | G06K 9/00281 |
| 2018/0096212 | A1* | 4/2018 | Lin | G06K 9/00261 |
| 2018/0260614 | A1* | 9/2018 | Wang | G06F 17/11 |
| 2019/0138791 | A1* | 5/2019 | Wang | G06K 9/00248 |
| 2019/0325256 | A1* | 10/2019 | Van Bree | G06K 9/00261 |
| 2020/0069034 | A1* | 3/2020 | Godlieb | A45D 42/08 |

FOREIGN PATENT DOCUMENTS

| | | |
|---|---|---|
| CN | 104850828 A | 8/2015 |
| CN | 105469056 A | 4/2016 |
| CN | 106778585 A | 5/2017 |

OTHER PUBLICATIONS

The State Intellectual Property Office of the People's Republic of China (SIPO) Office Action 1 for 201611121387.1 dated Sep. 6, 2018 7 Pages (including translation).

Paul Viola et al., "Robust Real-Time Face Detection", International Journal of Computer Vision, May 2004, vol. 57, Issue 2, pp. 137-154 Total 18 Pages.

Xudong Cao et al., "Face Alignment by Explicit Shape Regression", International Journal of Computer Vision, Apr. 2014, vol. 107, Issue 2, DOI: 10.1007/s11263-013-0667-3 Total 14 Pages.

Kaipeng Zhang et al., "Joint Face Detection and Alignment using Multi-task Cascaded Convolutional Networks", IEEE Signal Processing Letters, vol. 23, Issue: 10, Oct. 2016 Total 5 Pages.

* cited by examiner

FACIAL TRACKING METHOD AND APPARATUS, AND STORAGE MEDIUM

CROSS-REFERENCES TO RELATED APPLICATIONS

This application is a continuation application of PCT Patent Application No. PCT/CN2017/112059, filed on Nov. 21, 2017, which claims priority to Chinese Patent Application No. 201611121387.1, filed with the Chinese Patent Office on Dec. 8, 2016 and entitled "FACIAL KEY POINT TRACKING METHOD AND APPARATUS", which is incorporated herein by reference in its entirety.

FIELD OF TECHNOLOGY

Embodiments of the present disclosure relate to the field of communications technologies, and specifically, to a facial tracking method and apparatus, and a storage medium.

BACKGROUND OF THE DISCLOSURE

With rapid development of computer technologies, image processing technologies, and the like, a face recognition technology has also made considerable progress. Face recognition can be applied not only to image processing but also to the identity authentication field and the like. Therefore, in recent years, face recognition has also been one of research focuses.

Face recognition is based on detection of facial key points. To accurately recognize a face in a video stream, facial key points need to be tracked for each face in the video stream. Facial key points are information that can reflect facial features, for example, an eye, an eyebrow, a nose, a mouth, and an outer contour of a face.

SUMMARY

Embodiments of the present disclosure provide a facial tracking method and apparatus, and a storage medium.

An embodiment of the present disclosure provides a facial tracking method. The method includes: obtaining, by a computing terminal from a video stream, an image that currently needs to be processed as a current image frame; and obtaining coordinates of facial key points in a previous image frame of the current image frame, and a confidence level of the coordinates of the facial key points in the previous image frame. The method also includes calculating, by the computing terminal, coordinates of facial key points in the current image frame according to the coordinates of the facial key points in the previous image frame when the confidence level is higher than a preset threshold. Multi-face recognition on the current image frame is performed according to the coordinates of the facial key points in the current image frame, and a confidence level of the coordinates of the facial key points in the current image frame is calculated. The method also includes going back, by the computing terminal, to perform the step of obtaining, from the video stream, an image that currently needs to be processed, until recognition on all image frames in the video stream is completed.

An embodiment of the present disclosure further provides a facial tracking apparatus. The apparatus includes: one or more memories; and one or more processors coupled to the one or more memories. The one or more processors are configured to perform: obtaining, from a video stream, an image that currently needs to be processed as a current image frame; and obtaining coordinates of facial key points in a previous image frame of the current image frame, and a confidence level of the coordinates of the facial key points in the previous image frame. The one or more processors are further configured to perform: calculating coordinates of facial key points in the current image frame according to the coordinates of the facial key points in the previous image frame when the confidence level is higher than a preset threshold. Multi-face recognition on the current image frame is performed according to the coordinates of the facial key points in the current image frame, and a confidence level of the coordinates of the facial key points in the current image frame is calculated. The one or more processors are further configured to perform: going back to perform the step of obtaining, from the video stream, an image that currently needs to be processed, until recognition on all image frames in the video stream is completed.

An embodiment of the present disclosure provides a non-volatile computer-readable storage medium, storing computer program instructions executable by at least one processor. The computer program instructions cause the at least one processor to perform: obtaining, from a video stream, an image that currently needs to be processed as a current image frame; and obtaining coordinates of facial key points in a previous image frame of the current image frame, and a confidence level of the coordinates of the facial key points in the previous image frame. The computer program instructions further cause the at least one processor to perform: calculating coordinates of facial key points in the current image frame according to the coordinates of the facial key points in the previous image frame when the confidence level is higher than a preset threshold. Multi-face recognition on the current image frame is performed according to the coordinates of the facial key points in the current image frame, and a confidence level of the coordinates of the facial key points in the current image frame is calculated. The computer program instructions further cause the at least one processor to perform: going back to perform the step of obtaining, from the video stream, an image that currently needs to be processed, until recognition on all image frames in the video stream is completed.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without any creative work shall fall within the protection scope of the present disclosure.

Embodiments of the present disclosure provide a facial tracking method and apparatus. Facial tracking, as used herein, may refer to tracking key points in a face occurred in an image or a frame. Facial key points may be pixels in the image/frame that represents that can reflect facial features, for example, an eye, an eyebrow, a nose, a mouth, and an outer contour of a face.

Figure 1A:
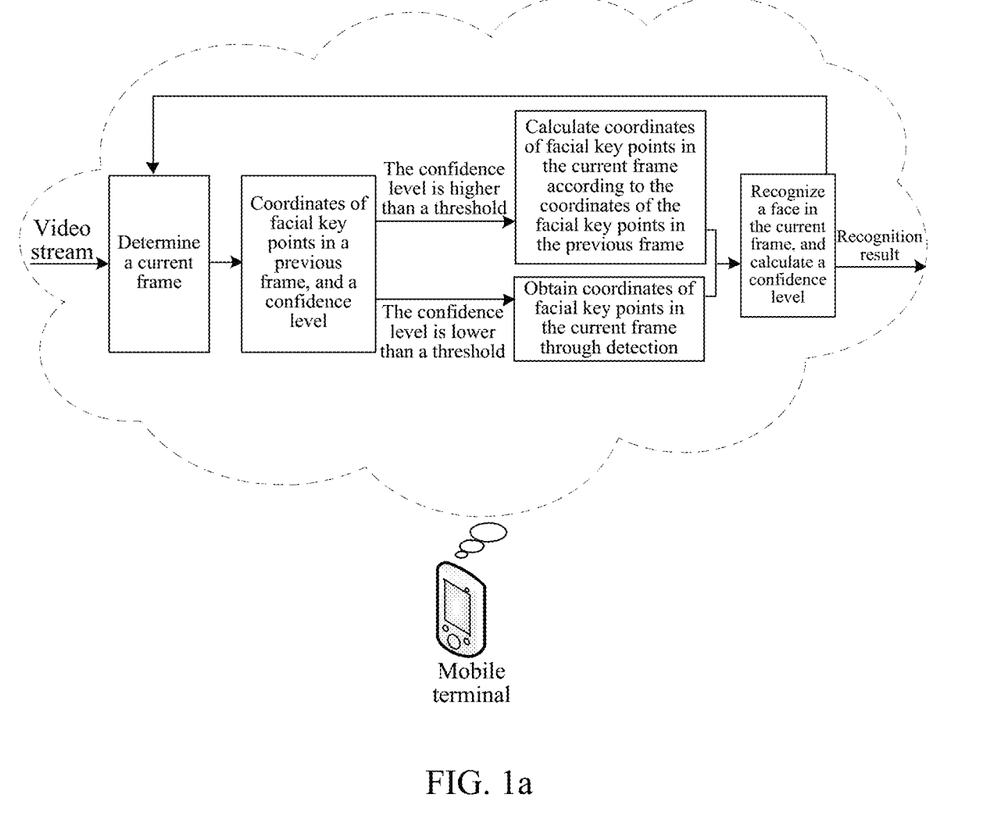
FIG. 1a is a schematic diagram of a scenario of a facial tracking method according to an embodiment of the present disclosure.

The facial tracking apparatus is specifically integrated into a device such as a mobile terminal. For example, referring to FIG. 1a, when tracking facial key points in an image in a video stream, the mobile terminal may deduce coordinates of facial key points in a current frame according to coordinates of facial key points in a previous image frame, and a confidence level of the coordinates of the facial key points in the previous image frame, for example, calculate the coordinates of the facial key points in the current frame according to the coordinates of the facial key points in the previous image frame when the confidence level is higher than a preset threshold; or detect a face position in the current frame if the confidence level is lower than a preset threshold, to obtain the coordinates of the facial key points in the current frame; then, perform multi-face recognition on the current frame according to the coordinates of the facial key points in the current frame, and calculate a confidence level of the coordinates of the facial key points in the current frame; and repeatedly perform the foregoing steps, until recognition on all images in the video stream is completed, to track facial key points in the video stream in real time.

It may be understood that, a "current frame" in the embodiments of the present disclosure means a "current image frame".

Detailed descriptions are separately provided below. It should be noted that, the sequence numbers of the following embodiments are not intended to limit preference orders of the embodiments.

The following embodiment is described from the perspective of a facial tracking apparatus. The facial tracking apparatus may be specifically integrated into a device such as a mobile terminal. The mobile terminal may include a mobile phone, a tablet computer, an intelligent wearable device, or the like.

A facial tracking method includes: obtaining, from a video stream, an image that currently needs to be processed as a current frame (i.e., current image frame); obtaining coordinates of facial key points in a previous image frame of the current frame, and a confidence level of the coordinates of the facial key points in the previous image frame; calculating coordinates of facial key points in the current frame according to the coordinates of the facial key points in the previous image frame when the confidence level is higher than a preset threshold; and performing multi-face recognition on the current frame according to the coordinates of the facial key points in the current frame, calculating a confidence level of the coordinates of the facial key points in the current frame, and going back to perform the step of obtaining, from a video stream, an image that currently needs to be processed, until recognition on all images in the video stream is completed.

Figure 1B:
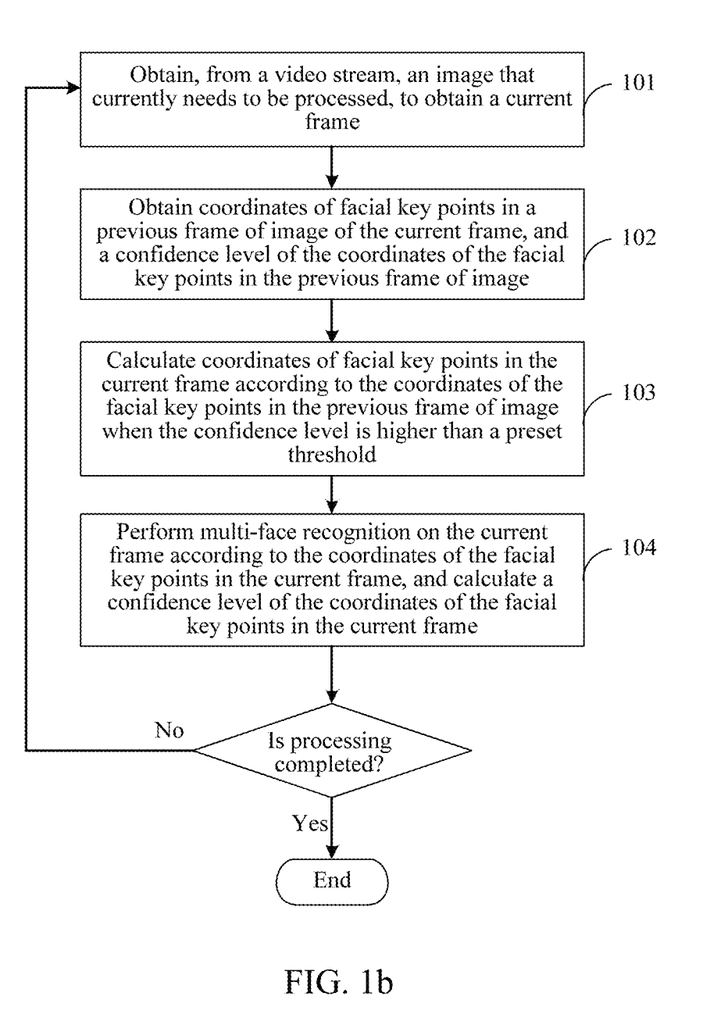
FIG. 1b is a flowchart of a facial tracking method according to an embodiment of the present disclosure.

As shown in FIG. 1b, a specific procedure of the facial tracking method may be as follows:

101: Obtain, from a video stream, an image that currently needs to be processed as a current frame.

For example, a video stream may be specifically obtained locally or from another device, and then, an image that currently needs to be processed is determined in the video stream, to obtain a current frame.

102: Obtain coordinates of facial key points in a previous image frame of the current frame, and a confidence level of the coordinates of the facial key points in the previous image frame.

For example, if there is a single face in the previous image frame, coordinates of facial key points of the face, and a corresponding confidence level may be obtained. If there are multiple faces in the previous image frame, coordinates of the facial key points of the faces, and corresponding confidence levels may be obtained.

Facial key points are information that can reflect facial features, for example, an eye, an eyebrow, a nose, a mouth, and an outer contour of a face. The coordinates of the facial key points may be represented by using an array, for example, an array $(x_1, y_1, x_2, y_2, \ldots, x_n, y_n)$, where $(x_i, y_i)$ indicates coordinates of an point.

103: Calculate coordinates of facial key points in the current frame according to the coordinates of the facial key points in the previous image frame when the confidence level (that is, the confidence level of the coordinates of the facial key points in the previous image frame) is higher than a preset threshold. For example, details may be as follows:

(1) An envelope box of the coordinates of the facial key points in the previous image frame is calculated, to obtain a registration coordinate box. In some embodiments, the calculated envelop box is directly used as the registration coordinate box. Details may be as follows:

A. A minimum value and a maximum value in all horizontal coordinates of the coordinates of the facial key points in the previous image frame are separately calculated, to obtain a minimum horizontal coordinate and a maximum horizontal coordinate.

B. A minimum value and a maximum value in all vertical coordinates of the coordinates of the facial key points in the previous image frame are separately calculated, to obtain a minimum vertical coordinate and a maximum vertical coordinate.

C. The envelope box of the coordinates of the facial key points is calculated according to the minimum horizontal coordinate, the maximum horizontal coordinate, the minimum vertical coordinate, and the maximum vertical coordinate, to obtain a registration coordinate box.

For example, coordinates of a reference point of the envelope box may be determined according to the minimum horizontal coordinate/the maximum horizontal coordinate, and the minimum vertical coordinate/the maximum vertical coordinate; a difference between the maximum horizontal coordinate and the minimum horizontal coordinate may be calculated, to obtain a width of the envelope box; a difference between the maximum vertical coordinate and the minimum vertical coordinate may be calculated, to obtain a height of the envelope box; and then, the envelope box is drawn according to the coordinates of the reference point, the width, and the height, to obtain the registration coordinate box.

It may be understood that, herein, the symbol "/" means "or". Therefore, it may be described as "determining coordinates of a reference point of the envelope box according to one of the minimum horizontal coordinate and the maximum horizontal coordinate and one of the minimum vertical coordinate and the maximum vertical coordinate".

A reference point may be selected according to an actual application requirement. For example, the upper left corner, the lower left corner, the upper right corner, the upper right corner, or the like of the envelope box may be used as the reference point. According to different selected reference points, manners of determining coordinates of the reference points may be different. For example, details may be as follows:

If the upper left corner of the envelope box is used as the reference point, the step of "determining coordinates of a reference point of the envelope box according to the minimum horizontal coordinate/the maximum horizontal coordinate, and the minimum vertical coordinate/the maximum vertical coordinate" may be specifically: using the minimum horizontal coordinate and the maximum vertical coordinate as coordinates of the upper left corner of the envelope box.

If the lower left corner of the envelope box is used as the reference point, the step of "determining coordinates of a reference point of the envelope box according to the minimum horizontal coordinate/the maximum horizontal coordinate, and the minimum vertical coordinate/the maximum vertical coordinate" may be specifically: using the minimum horizontal coordinate and the minimum vertical coordinate as coordinates of the lower left corner of the envelope box.

If the upper right corner of the envelope box is used as the reference point, the step of "determining coordinates of a reference point of the envelope box according to the minimum horizontal coordinate/the maximum horizontal coordinate, and the minimum vertical coordinate/the maximum vertical coordinate" may be specifically: using the maximum horizontal coordinate and the maximum vertical coordinate as coordinates of the upper right corner of the envelope box.

If the lower right corner of the envelope box is used as the reference point, the step of "determining coordinates of a reference point of the envelope box according to the minimum horizontal coordinate/the maximum horizontal coordinate, and the minimum vertical coordinate/the maximum vertical coordinate" may be specifically: using the maximum horizontal coordinate and the minimum vertical coordinate as coordinates of the lower right corner of the envelope box.

(2) Positions of the facial key points in the current frame are calculated according to the registration coordinate box, to obtain the coordinates of the facial key points in the current frame.

For example, the registration coordinate box may be specifically used as an envelope box of the facial key points in the current frame, to deduce the positions of the facial key points in the current frame, so as to obtain the coordinates of the facial key points in the current frame. In some embodiments, detection of facial key points of the current frame is confined within the registration coordinate box to reduce computation complexity and save computing resources. Further, a face registration algorithm (e.g., a face key point localization algorithm) can be performed using the registration coordinate box.

It may be understood that, herein, a registration coordinate box of the previous image frame (that is, an envelope box of a face in the previous image frame) may be used as an envelope box of the same face in the current image frame. The reason is that: although positions of the face in the previous image frame and the face in the current image frame may be different, there is a small difference between the positions of the same faces in the two adjacent frames of images, that is, an offset between actual positions of the envelope box of the face in the previous image frame and the envelope box of the same face in the current image frame is very small. This causes no impact to subsequent calculation of the coordinates of the facial key points in the current image frame by using a facial key point technology.

After the coordinates of the facial key points in the current image frame are determined, the actual position of the envelope box of the face in the current image frame may be determined according to the coordinates of the facial key points in the current image frame, so that under a condition that a confidence level of the coordinates of the facial key points in the current image frame is greater than the preset threshold, the envelope box may be used as an envelope box of the face in a next image frame.

Optionally, to improve recognition accuracy, a face in the current frame may be further detected asynchronously by using an idle computing resource, for example, by using an idle time of a central processing unit (CPU) or an idle CPU, and the face is recognized by combining a detection result with the foregoing deduced result (that is, the registration coordinate box). That is, before the step of "calculating positions of the facial key points in the current frame according to the registration coordinate box, to obtain the coordinates of the facial key points in the current frame", the facial tracking method may further include:

detecting a face position in the current frame when determining that a capacity of current idle computing resources is greater than a specified threshold, to obtain a detection coordinate box.

In some embodiments, if a computation speed can reach 30 fps (frames per second) in a computing terminal (e.g., mobile terminal), it is considered as a real-time calculation. In other words, real-time computation can be realized if a computation time of the current image frame is less than about 33 ms (milliseconds). In practical scenarios, using the disclosed method, the steps of obtaining the registration coordinate box and extracting facial key points using the registration coordinate box usually take less than 33 ms (e.g., 15 ms). Accordingly, in the remaining time of the allowed duration for real-time computation (e.g., 33 ms-15 ms=18 ms), i.e., the idle computing resource, the disclosed asynchronous face detection step can be performed.

In this case, the step of "calculating positions of the facial key points in the current frame according to the registration coordinate box, to obtain the coordinates of the facial key points in the current frame" may include: combining the registration coordinate box with the detection coordinate box, to obtain a target coordinate box; and calculating the positions of the facial key points in the current frame according to the target coordinate box, to obtain the coordinates of the facial key points in the current frame. That is, the target coordinate box is determined according to the registration coordinate box and the detection coordinate box; and then, the positions of the facial key points in the current frame are calculated according to the target coordinate box.

For example, an overlap rate between the registration coordinate box of a frame and the detection coordinate box corresponding to the same frame may be calculated; and the registration coordinate box and the detection coordinate box may be filtered according to the overlap rate, to obtain the target coordinate box. For example, details may be as follows:

A corresponding detection coordinate box is deleted and a corresponding registration coordinate box is determined as the target coordinate box if the overlap rate is greater than a specified value, or both a corresponding detection coordinate box and a corresponding registration coordinate box are determined as the target coordinate boxes if the overlap rate is less than or equal to a specified value; or a corresponding registration coordinate box is deleted and a corresponding detection coordinate box is determined as the target coordinate box if the overlap rate is greater than a specified value, or both a corresponding detection coordinate box and a corresponding registration coordinate box are determined as the target coordinate box if the overlap rate is less than or equal to a specified value. In some embodiments, using both detection coordinate box and registration coordinate box as the target coordinate box may include: obtaining a minimum box that can include both the detection coordinate box and the registration coordinate box as the target coordinate box. The target coordinate box may be used as a confined area for extracting/calculating the facial key points. In some embodiments, the detection coordinate box is deleted and the registration coordinate box is determined as the target coordinate box if the overlap rate is greater than a specified value; and the registration coordinate box is deleted and the detection coordinate box is determined as the target coordinate box if the overlap rate is equal to or less than a specified value.

It should be noted that, if the confidence level (that is, the confidence level of the coordinates of the facial key points in the previous image frame) is lower than (that is, not higher than, including being equal to) the preset threshold, it indicates that reference value of the coordinates of the facial key points in the previous frame is relatively low. Therefore, in this case, the coordinates of the facial key points in the current frame may be obtained through detection. That is, before the step of "recognizing a face in the current frame according to the coordinates of the facial key points in the current frame", the facial tracking method may further include:

detecting a face position in the current frame when the confidence level is lower than the preset threshold, to obtain a detection coordinate box; and calculating positions of the facial key points in the current frame according to the detection coordinate box, to obtain the coordinates of the facial key points in the current frame.

The preset threshold, the specified threshold, and the specified value may be set according to an actual application requirement, and details are not described herein.

104: Perform multi-face recognition on the current frame according to the coordinates of the facial key points in the current frame, calculate a confidence level of the coordinates of the facial key points in the current frame, and go back to perform step 101, that is, go back to perform the step of "obtaining, from a video stream, an image that currently needs to be processed", until recognition on all images in the video stream is completed.

That is, the coordinates of the facial key points in the current frame, and the confidence level are used as reference for recognition on the next image frame. This process is repeated, until recognition on all the images in the video stream is completed.

To reduce a calculation time, and save computing resources, calculation of the coordinates of the facial key points and calculation of the confidence level may be synchronous.

It should be noted that, if the coordinates of the facial key points in the previous image frame of the current frame, and the confidence level cannot be obtained, for example, the current frame is a first frame of the video stream, the coordinates of the facial key points in the current frame may be obtained through detection. That is, before the step of "performing multi-face recognition on the current frame according to the coordinates of the facial key points in the current frame", the facial tracking method may further include:

detecting a face position in the current frame if the coordinates of the facial key points in the previous image frame of the current frame, and the confidence level cannot be obtained, to obtain a detection coordinate box; calculating the positions of the facial key points in the current frame according to the detection coordinate box, to obtain the coordinates of the facial key points in the current frame; and then performing step 104.

It may be learned from the above that, in this embodiment, coordinates of facial key points in a previous image frame and a confidence level may be obtained, to deduce coordinates of facial key points in a current frame; and then, multi-face recognition may be performed on the current frame according to the coordinates of the facial key points in the current frame, and a corresponding confidence level of the current frame may be calculated, to provide reference for a next image frame. This process is repeated, until recognition on all images in a video stream is completed, to achieve an objective of tracking facial key points in the video stream in real time. In this solution, the coordinates of the facial key points in the current frame are calculated by referring to a recognition result of the previous frame without performing detection frame by frame. Therefore, compared with an existing solution in which detection needs to be performed frame by frame, a detection time can be greatly reduced to improve processing efficiency, and resource consumption can be reduced. This facilitates real-time calculation by a mobile terminal.

According to the method described in previous embodiments, the following further provides detailed descriptions by using an example.

In this embodiment, an example in which the facial tracking apparatus is specifically integrated into a mobile terminal is used for description.

Figure 2:
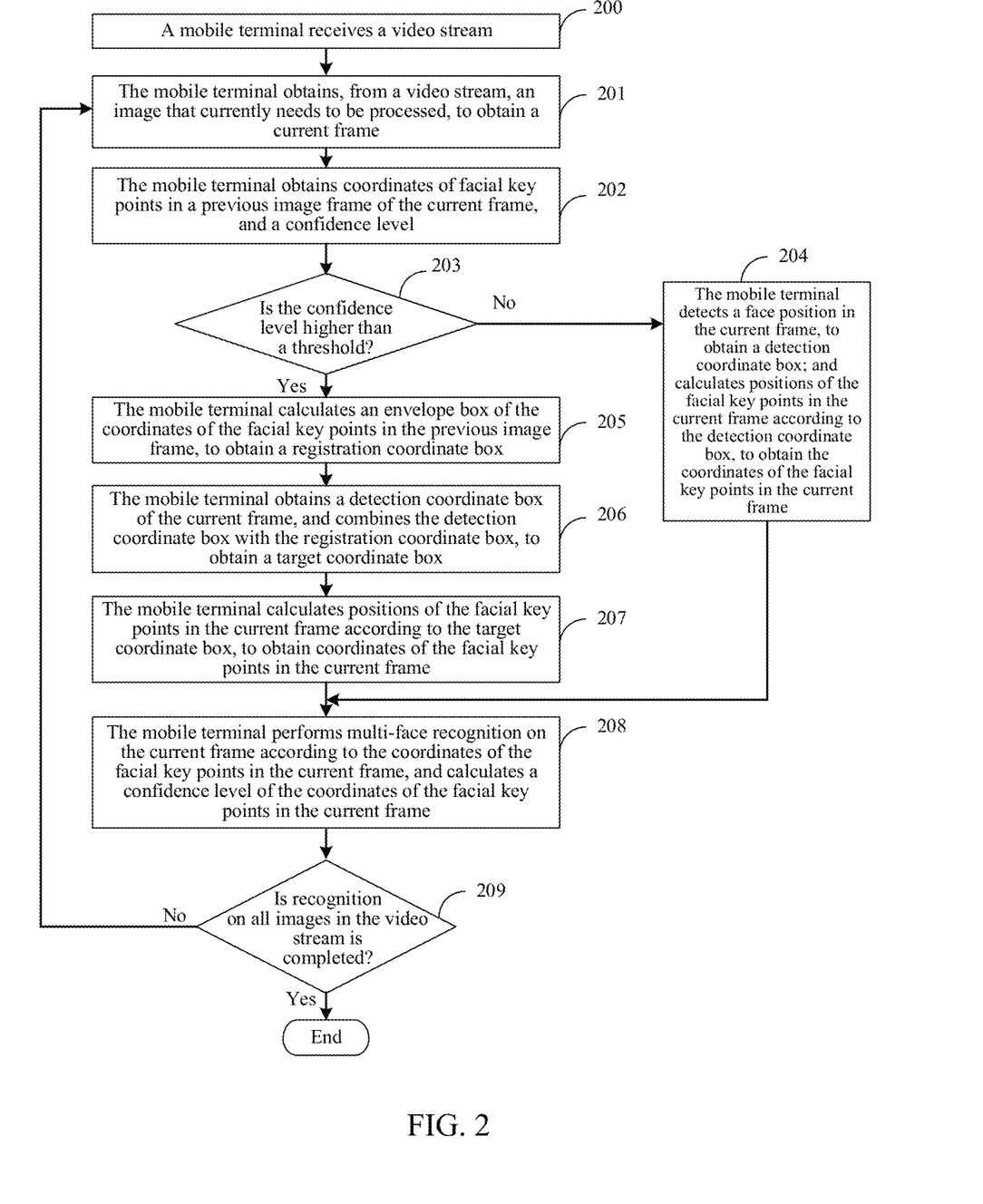
FIG. 2 is another flowchart of a facial tracking method according to an embodiment of the present disclosure.

As shown in FIG. 2, a specific procedure of a facial tracking method may be as follows:

200: The mobile terminal receives a video stream.

For example, the mobile terminal may specifically receive a video stream sent by another device, or obtain a video stream from local storage space.

201: The mobile terminal obtains, from the video stream, an image that currently needs to be processed, to obtain a current frame.

202: The mobile terminal obtains coordinates of facial key points in a previous image frame of the current frame, and a confidence level of the coordinates of the facial key points in the previous image frame.

For example, if there is a single face in the previous image frame, coordinates of facial key points of the face, and a corresponding confidence level may be obtained. If there are multiple faces in the previous image frame, coordinates of the facial key points of the faces, and corresponding confidence levels may be obtained.

Facial key points are information that can reflect facial features, for example, an eye, an eyebrow, a nose, a mouth, and an outer contour of a face. Coordinates of facial key points are coordinates of the facial key points. The coordinates of the facial key points may be represented by using an array $(x_1, y_1, x_2, y_2, \ldots, x_n, y_n)$, where $(x_i, y_i)$ indicates coordinates of an $i^{th}$ point.

It should be noted that, if the coordinates of the facial key points in the previous image frame of the current frame, and the confidence level cannot be obtained, for example, the current frame is a first frame of the video stream, coordinates of the facial key points in the current frame may be obtained through detection. That is, step 204 is performed.

203: The mobile terminal determines whether the confidence level of the coordinates of the facial key points in the previous image frame is higher than a preset threshold; and if yes, it indicates that the facial key points are successfully tracked, and the mobile terminal performs step 205; or if the confidence level is not higher than the preset threshold, it indicates that the facial key points are unsuccessfully tracked, and the mobile terminal performs step 204.

The preset threshold may be set according to an actual application requirement, and details are not described herein.

It may be understood that, when the facial key points are successfully tracked, a face position in the current image frame may be analyzed by using the coordinates of the facial key points in the previous image frame, and therefore, step 205 is performed; or when the facial key points are unsuccessfully tracked, a face position in the current image frame cannot be analyzed by using the coordinates of the facial key points in the previous image frame, and therefore, step 204 is performed.

204: The mobile terminal detects a face position in the current frame, to obtain a detection coordinate box; calculates positions of the facial key points in the current frame according to the detection coordinate box, to obtain coordinates of the facial key points in the current frame; and then performs step 208.

205: The mobile terminal calculates an envelope box of the coordinates of the facial key points in the previous image frame when the confidence level is higher than the preset threshold, to obtain a registration coordinate box. Details may be as follows:

(1) The mobile terminal separately calculates a minimum value and a maximum value in all horizontal coordinates of the coordinates of the facial key points in the previous image frame, to obtain a minimum horizontal coordinate and a maximum horizontal coordinate.

For example, an example in which the coordinates of the facial key points in the previous image frame are $(x_1, y_1, x_2, y_2, \ldots, x_n, y_n)$ is used. In this case, the following may be calculated:

the minimum horizontal coordinate $x_{min}=\min(x_1,x_2,\ldots,x_n)$; and the maximum horizontal coordinate $x_{max}=\max(x_1,x_2,\ldots,x_n)$.

(2) The mobile terminal separately calculates a minimum value and a maximum value in all vertical coordinates of the coordinates of the facial key points in the previous image frame, to obtain a minimum vertical coordinate and a maximum vertical coordinate.

For example, the example in which the coordinates of the facial key points in the previous image frame are $(x_1, y_1, x_2, y_2, \ldots, x_n, y_n)$ is still used. In this case, the following may be calculated:

the minimum vertical coordinate $y_{min}=\min(y_1,y_2,\ldots,y_n)$; and the maximum vertical coordinate $y_{max}=\max(y_1,y_2,\ldots,y_n)$.

(3) The mobile terminal calculates the envelope box of the coordinates of the facial key points according to the minimum horizontal coordinate, the maximum horizontal coordinate, the minimum vertical coordinate, and the maximum vertical coordinate, to obtain the registration coordinate box.

For example, coordinates of a reference point of the envelope box may be determined according to the minimum horizontal coordinate/the maximum horizontal coordinate, and the minimum vertical coordinate/the maximum vertical coordinate; a difference between the maximum horizontal coordinate and the minimum horizontal coordinate may be calculated, to obtain a width of the envelope box; a difference between the maximum vertical coordinate and the minimum vertical coordinate may be calculated, to obtain a height of the envelope box; and then, the envelope box is drawn according to the coordinates of the reference point, the width, and the height, to obtain the registration coordinate box.

For example, if the width of the envelope box is denoted by w, and the height of the envelope box is denoted by h, $w=x_{max}-x_{min}=\max(x_1,x_2,\ldots,x_n)-\min(x_1,x_2,\ldots,x_n)$;

$h=y_{max}-y_{min}=\max(y_1,y_2,\ldots,y_n)-\min(y_1,y_2,\ldots,y_n)$.

A reference point may be selected according to an actual application requirement. For example, the upper left corner, the lower left corner, the upper right corner, the upper right corner, or the like of the envelope box may be used as the reference point. According to different selected reference points, manners of determining coordinates of the reference points may be different. For example, details may be as follows:

If the upper left corner of the envelope box is used as the reference point, the minimum horizontal coordinate and the maximum vertical coordinate may be specifically used as coordinates of the upper left corner of the envelope box. That is, the coordinates of the reference point is (x n, $y_{max}$).

If the lower left corner of the envelope box is used as the reference point, the minimum horizontal coordinate and the minimum vertical coordinate may be specifically used as coordinates of the lower left corner of the envelope box. That is, the coordinates of the reference point is ($x_{min}$, $y_{min}$).

If the upper right corner of the envelope box is used as the reference point, the maximum horizontal coordinate and the maximum vertical coordinate may be specifically used as coordinates of the upper right corner of the envelope box. That is, the coordinates of the reference point is ($x_{max}$, $y_{max}$).

If the lower right corner of the envelope box is used as the reference point, the maximum horizontal coordinate and the minimum vertical coordinate may be specifically used as coordinates of the lower right corner of the envelope box. That is, the coordinates of the reference point is ($x_{max}$, $y_{min}$).

That is, if the upper left corner of the envelope box is used as the reference point, the envelope box is ($x_{min}$, $y_{max}$, w, h); or if the lower left corner of the envelope box is used as the reference point, the envelope box is ($x_{min}$, $y_{min}$, w, h); or if the upper right corner of the envelope box is used as the reference point, the envelope box is ($x_{max}$, $y_{max}$, w, h); or if the lower right corner of the envelope box is used as the reference point, the envelope box is ($x_{max}$, $y_{min}$, w, h).

206: The mobile terminal obtains a detection coordinate box of the current frame, combines the detection coordinate box with the registration coordinate box obtained from step 205, to obtain a target coordinate box, and then performs step 207.

For example, the mobile terminal may separately calculate an overlap rate between each registration coordinate box and each detection coordinate box; and filter the registration coordinate box and the detection coordinate box according to the overlap rate, to obtain the target coordinate box.

The detection coordinate box of the current frame in step 206 is a detection coordinate box of a face image in the current image frame. The detection coordinate box may be specifically obtained by using a face detection technology, and may be denoted in a form: (the horizontal coordinate of the reference point, the vertical coordinate of the reference point, a width of the detection coordinate box, a height of the detection coordinate box). The reference point may be the upper left corner, the upper right corner, the lower left corner, the lower right corner, or the like of the detection coordinate box.

For example, when the overlap rate is greater than a specified value, it may be considered that a same face is recognized in the detection coordinate box and the registration coordinate box. Therefore, the repeated coordinate box may be deleted, and either of the detection coordinate box and the registration coordinate box is reserved. If the overlap rate is less than or equal to a specified value, it indicates that different faces are recognized in the detection coordinate box and the registration coordinate box. Therefore, both the detection coordinate box and the registration coordinate box may be reserved. That is, the target coordinate box may be obtained through filtering in either of the following manners:

(1) First Manner

A corresponding detection coordinate box is deleted and a corresponding registration coordinate box is determined as the target coordinate box if the overlap rate is greater than the specified value; or both a corresponding detection coordinate box and a corresponding registration coordinate box are determined as the target coordinate boxes if the overlap rate is less than or equal to the specified value.

(2) Second Manner

A corresponding registration coordinate box is deleted and a corresponding detection coordinate box is determined as the target coordinate box if the overlap rate is greater than the specified value; or both a corresponding detection coordinate box and a corresponding registration coordinate box are determined as the target coordinate boxes if the overlap rate is less than or equal to the specified value.

The specified value may be set according to an actual application requirement, and details are not described herein.

The overlap rate may be calculated by using the Intersection Over Union (IOU). For example, an example in which the detection coordinate box is K1, and the registration coordinate box is K2 is used, so that the overlap rate IOU may be as follows:

$$IOU=(K1 \cap K2)/(K1 \cup K2)$$

It should be noted that, if the mobile terminal cannot obtain the detection coordinate box of the current frame, the mobile terminal may directly use the registration coordinate box as the target coordinate box, and then perform step 207 (that is, positions of the facial key points in the current frame are directly calculated according to the registration coordinate box, to obtain the coordinates of the facial key points in the current frame).

The detection coordinate box of the current frame may be calculated asynchronously. For example, the face position in the current frame may be detected asynchronously by using an idle computing resource, for example, by using an idle time of a CPU or an idle CPU, to obtain the detection coordinate box. A specific detection method is the same as that in step 204, and details are not described herein again.

207: The mobile terminal calculates positions of the facial key points in the current frame according to the target coordinate box, to obtain the coordinates of the facial key points in the current frame, and then performs step 208.

208: The mobile terminal performs multi-face recognition on the current frame according to the coordinates of the facial key points in the current frame, calculates a confidence level of the coordinates of the facial key points in the current frame, and then performs step 209.

To reduce a calculation time, and save computing resources, calculation of the coordinates of the facial key points and calculation of the confidence level may be synchronous. In some embodiments, a face registration algorithm used in tracking face key points may output coordinates of the face key points and the confidence level at the same time, such as a joint face detection and alignment algorithm using multi-task cascaded convolutional networks. In some embodiments, a face registration algorithm used in tracking face key points may not be able to output the confidence level together with the coordinates of the face key points, such as an explicit shape regression algorithm. In this scenario, a support vector machine (SVM) algorithm may be used to analyze and obtain the confidence level.

209: The mobile terminal determines whether recognition on all images in the video stream is completed; and if yes, ends the procedure; otherwise, goes back to perform step 201.

That is, the coordinates of the facial key points in the current frame, and the confidence level are used as reference for tracking facial key points in a next image frame. This process is repeated, until recognition on all the images in the video stream is completed.

It may be learned from the above that, in this embodiment, coordinates of facial key points in a previous image frame and a confidence level may be obtained, to deduce coordinates of facial key points in a current frame; and then, multi-face recognition may be performed on the current frame according to the coordinates of the facial key points in the current frame, and a corresponding confidence level of the current frame may be calculated, to provide reference for a next image frame. This process is repeated, until recognition on all images in a video stream is completed, to achieve an objective of tracking facial key points in the video stream in real time. In this solution, when the coordinates of the facial key points in the current frame are calculated, refer to a recognition result of the previous frame without performing detection frame by frame. Therefore, compared with an existing solution in which detection needs to be performed frame by frame, a detection time can be greatly reduced to improve processing efficiency, and resource consumption can be reduced. In addition, because calculation of the coordinates of the facial key points and calculation of the confidence level may be synchronous, a calculation time can be further reduced and resources can be further saved. In other words, by using face registration techniques to track face key points according to confidence level, excessive face detection calculations for certain frames can be avoided (e.g., when tracking is determined as successful in step 203), which facilitates real-time calculation by a mobile terminal. By using asynchronized face detection mechanism, idle computing power can be used to detect face key points (e.g., when tracking is determined as unsuccessful in step 203, such as a face newly entered to the video, or a face that had a substantial displacement), while ensuring real-time calculation.

Figure 3A:
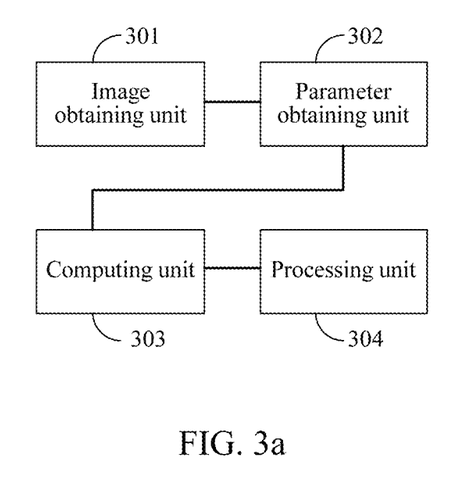
FIG. 3a is a schematic structural diagram of a facial tracking apparatus according to an embodiment of the present disclosure.

To better implement the foregoing method, this embodiment of the present disclosure further provides a facial tracking apparatus. As shown in FIG. 3a, the facial tracking apparatus may be a mobile terminal, and includes:

one or more memories; and
one or more processors, the one or more memories storing one or more instruction modules, configured to be executed by the one or more processors.

The one or more instruction modules include an image obtaining unit 301, a parameter obtaining unit 302, a computing unit 303, and a processing unit 304. Details are as follows:

(1) Image Obtaining Unit 301

The image obtaining unit 301 is configured to obtain, from a video stream, an image that currently needs to be processed, to obtain a current frame.

For example, the image obtaining unit 301 may be specifically configured to: obtain a video stream locally or from another device, and then, determine, in the video stream, an image that currently needs to be processed, to obtain a current frame.

(2) Parameter Obtaining Unit 302

The parameter obtaining unit 302 is configured to obtain coordinates of facial key points in a previous image frame of the current frame, and a confidence level of the coordinates of the facial key points in the previous image frame.

For example, if there is a single face in the previous image frame, the parameter obtaining unit 302 may obtain coordinates of facial key points of the face, and a corresponding confidence level. If there are multiple faces in the previous image frame, the parameter obtaining unit 302 may obtain coordinates of the facial key points of the faces, and corresponding confidence levels.

Facial key points are information that can reflect facial features, for example, an eye, an eyebrow, a nose, a mouth, and an outer contour of a face. Coordinates of facial key points are coordinates of the facial key points. The coordinates of the facial key points may be represented by using an array, for example, an array $(x_1, y_1, x_2, y_2, \ldots, x_n, y_n)$, where $(x_i, y_i)$ indicates coordinates of an $i^{th}$ point.

(3) Computing Unit 303

The computing unit 303 is configured to calculate coordinates of facial key points in the current frame according to the coordinates of the facial key points in the previous image frame when the confidence level is higher than a preset threshold.

For example, the computing unit 303 may include a first calculation subunit and a second calculation subunit. Details are as follows:

The first calculation subunit is configured to calculate an envelope box of the coordinates of the facial key points in the previous image frame when the confidence level is higher than the preset threshold, to obtain a registration coordinate box.

The second calculation subunit is configured to calculate positions of the facial key points in the current frame according to the registration coordinate box, to obtain the coordinates of the facial key points in the current frame.

For example, the first calculation subunit may be specifically configured to: separately calculate a minimum value and a maximum value in all horizontal coordinates of the coordinates of the facial key points in the previous image frame when the confidence level is higher than the preset threshold, to obtain a minimum horizontal coordinate and a maximum horizontal coordinate; separately calculate a minimum value and a maximum value in all vertical coordinates of the coordinates of the facial key points in the previous image frame, to obtain a minimum vertical coordinate and a maximum vertical coordinate; and calculate the envelope box of the coordinates of the facial key points according to the minimum horizontal coordinate, the maximum horizontal coordinate, the minimum vertical coordinate, and the maximum vertical coordinate, to obtain the registration coordinate box.

A reference point may be selected according to an actual application requirement. For example, the upper left corner, the lower left corner, the upper right corner, the upper right corner, or the like of the envelope box may be used as the reference point. According to different selected reference points, manners of determining coordinates of the reference points may be different. For details, refer to the foregoing method embodiment, and details are not described herein again.

Figure 3B:
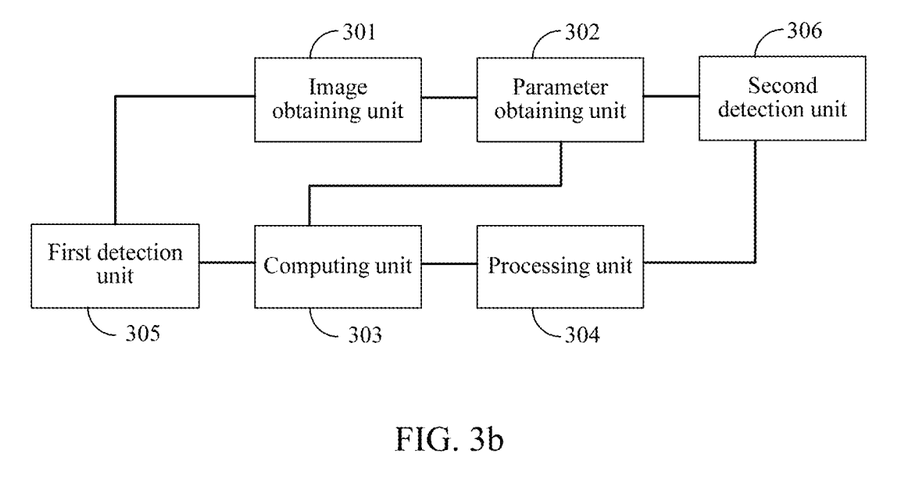
FIG. 3b is another schematic structural diagram of a facial tracking apparatus according to an embodiment of the present disclosure.

Optionally, to improve recognition accuracy, a face in the current frame may be further detected asynchronously by using an idle computing resource, and the face may be recognized by combining a detection result with the registration coordinate box. That is, as shown in FIG. 3b, the facial tracking apparatus may further include a first detection unit 305. Details are as follows:

The first detection unit 305 may be configured to detect a face position in the current frame when it is determined that a capacity of current idle computing resources is greater than a specified threshold, to obtain a detection coordinate box.

In this case, the second calculation subunit may be specifically configured to: combine the registration coordinate box with the detection coordinate box, to obtain a target coordinate box; and calculate the positions of the facial key points in the current frame according to the target coordinate box, to obtain the coordinates of the facial key points in the current frame.

For example, the second calculation subunit may be specifically configured to: calculate an overlap rate between each registration coordinate box and each detection coordinate box; and filter the registration coordinate box and the detection coordinate box according to the overlap rate, to obtain the target coordinate box. Details may be as follows:

A corresponding detection coordinate box is deleted and a corresponding registration coordinate box is determined as the target coordinate box if the overlap rate is greater than a specified value, or both a corresponding detection coordinate box and a corresponding registration coordinate box are determined as the target coordinate boxes if the overlap rate is less than or equal to a specified value; or a corresponding registration coordinate box is deleted and a corresponding detection coordinate box is determined as the target coordinate box if the overlap rate is greater than a specified value, or both a corresponding detection coordinate box and a corresponding registration coordinate box are determined as the target coordinate boxes if the overlap rate is less than or equal to a specified value.

(4) Processing Unit 304

The processing unit 304 is configured to: perform multi-face recognition on the current frame according to the coordinates of the facial key points in the current frame, calculate a confidence level of the coordinates of the facial key points in the current frame, and trigger the image obtaining unit to perform an operation of obtaining, from a video stream, an image that currently needs to be processed, until recognition on all images in the video stream is completed.

It should be noted that, if the confidence level of the coordinates of the facial key points in the previous image frame is not higher than the preset threshold, it indicates that reference value of the coordinates of the facial key points in the previous frame is relatively low. Therefore, in this case, the coordinates of the facial key points in the current frame may be obtained through detection. That is, the computing unit 303 may be further configured to: detect a face position in the current frame when the confidence level is lower than the preset threshold, to obtain a detection coordinate box; and calculate positions of the facial key points in the current frame according to the detection coordinate box, to obtain the coordinates of the facial key points in the current frame.

The preset threshold, the specified threshold, and the specified value may be set according to an actual application requirement, and details are not described herein.

In addition, it should be noted that, if the coordinates of the facial key points in the previous image frame of the current frame, and the confidence level cannot be obtained, for example, the current frame is a first frame of the video stream, the coordinates of the facial key points in the current frame may be obtained through detection. That is, as shown in FIG. 3b, the facial tracking apparatus may further include a second detection unit 306.

The second detection unit 306 may be configured to: detect a face position in the current frame when the coordinates of the facial key points in the previous image frame of the current frame, and the confidence level cannot be obtained, to obtain a detection coordinate box; and calculate the positions of the facial key points in the current frame according to the detection coordinate box, to obtain the coordinates of the facial key points in the current frame.

During specific implementation, the foregoing units may be separately implemented as independent entities, or may be combined arbitrarily, or may be implemented as a same entity or several entities. For specific implementation of the foregoing units, refer to the foregoing method embodiment. Details are not described herein again.

The facial tracking apparatus may be specifically integrated into a device such as a mobile terminal. The mobile terminal may include a mobile phone, a tablet computer, an intelligent wearable device, or the like.

It may be learned from the above that, the facial tracking apparatus in this embodiment may obtain coordinates of facial key points in a previous image frame and a confidence level, to deduce coordinates of facial key points in a current frame; and then, the processing unit 304 performs multi-face recognition on the current frame according to the coordinates of the facial key points in the current frame, and calculates a corresponding confidence level of the current frame, to provide reference for a next image frame. This process is repeated, until recognition on all images in a video stream is completed, to achieve an objective of tracking facial key points in the video stream in real time. In this solution, when the coordinates of the facial key points in the current frame are calculated, refer to a recognition result of the previous frame without performing detection frame by frame. Therefore, compared with an existing solution in which detection needs to be performed frame by frame, a detection time can be greatly reduced to improve processing efficiency, and resource consumption can be reduced. This facilitates real-time calculation by a mobile terminal.

Figure 4:
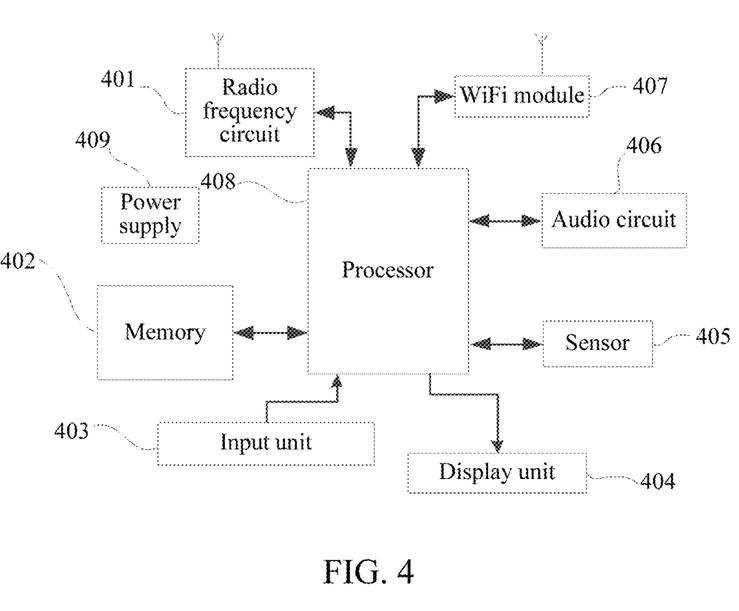
FIG. 4 is a schematic structural diagram of a mobile terminal according to an embodiment of the present disclosure.

Correspondingly, this embodiment of the present disclosure further provides a mobile terminal. As shown in FIG. 4, the mobile terminal may include components such as a radio frequency (RF) circuit 401, a memory 402 including one or more computer-readable storage mediums, an input unit 403, a display unit 404, a sensor 405, an audio circuit 406, a wireless fidelity (WiFi) module 407, a processor 408 including one or more processing cores, and a power supply 409. A person skilled in the art may understand that, the structure of the mobile terminal shown in FIG. 4 does not constitute a limitation to the mobile terminal, and the mobile terminal may include more components or fewer components than those shown in the figure, or some components may be combined, or a different component deployment may be used.

The RF circuit 401 may be configured to receive and send signals during information receiving and sending or during a call. Particularly, the RF circuit 401 receives downlink information from a base station, then delivers the downlink information to one or more processors 408 for processing, and sends related uplink data to the base station. Generally, the RF circuit 401 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 401 may further communicate with a network and another device through wireless communication. The wireless communication may use any communication standard or protocol, which includes, but is not limited to, a Global System for Mobile communications (GSM), a general packet radio service (GPRS), Code Division Multiple Access (CDMA), Wideband Code Division Multiple Access (WCDMA), Long Term Evolution (LTE), e-mail, Short Messaging Service (SMS), and the like.

The memory 402 may be configured to store a software program and module. The processor 408 runs the software program and module stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 402 may include a high-speed random access memory (RAM), and may further include a non-volatile memory, such as at least one magnetic disk storage device, a flash memory, or other volatile solid-state storage devices. Correspondingly, the memory 402 may further include a memory controller, to provide access of the processor 408 and the input unit 403 to the memory 402.

The input unit 403 may be configured to receive input digit or character information, and generate a keyboard, mouse, joystick, optical or track ball signal input related to the user setting and function control. Specifically, in a specific embodiment, the input unit 403 may include a touch-sensitive surface and another input device. The touch-sensitive surface, which is also referred to as a touchscreen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 408. Moreover, the touch controller can receive and execute a command sent by the processor 408. In addition, the touch-sensitive surface may be implemented in multiple types, such as a resistive type, a capacitive type, an infrared type, and a surface acoustic wave type. In addition to the touch-sensitive surface, the input unit 403 may further include another input device. Specifically, the another input device may include, but is not limited to, one or more of a physical keyboard, a function key (for example, a volume control key or a power on/off key), a trackball, a mouth, or a joystick.

The display unit 404 may be configured to display information input by the user or information provided for the user, and various graphical user interfaces of the mobile terminal. The graphical user interfaces may be formed by a graph, a text, an icon, a video, or any combination thereof. The display unit 404 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 408 to determine a type of a touch event, and then the processor 408 provides a corresponding visual output on the display panel according to the type of the touch event. Although in FIG. 4, the touch-sensitive surface and the display panel are used as two separate parts to implement input and output functions, in some embodiments, the touch-sensitive surface and the display panel may be integrated to implement the input and output functions.

The mobile terminal may further include at least one sensor 405 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile terminal, are not further described herein.

The audio circuit 406, a speaker, and a microphone may provide audio interfaces between the user and the mobile terminal. The audio circuit 406 may convert received audio data into an electrical signal and transmit the electrical signal to the speaker. The speaker converts the electrical signal into a sound signal for output. On the other hand, the microphone converts a collected sound signal into an electrical signal. The audio circuit 406 receives the electrical signal and converts the electrical signal into audio data, and outputs the audio data to the processor 408 for processing. Then, the processor 408 sends the audio data to, for example, another mobile terminal by using the RF circuit 401, or outputs the audio data to the memory 402 for further processing. The audio circuit 406 may further include an earplug jack, so as to provide communication between a peripheral earphone and the mobile terminal.

WiFi is a short distance wireless transmission technology. The mobile terminal may help, by using the WiFi module 407, the user to receive and send e-mails, browse a web page, access streaming media, and the like, which provides wireless broadband Internet access for the user. Although FIG. 4 shows the WiFi module 407, it may be understood that the WiFi module 407 is not a necessary component of the mobile terminal, and when required, the WiFi module 407 may be omitted as long as the scope of the essence of the present disclosure is not changed.

The processor 408 is the control center of the mobile terminal, and is connected to various parts of the mobile terminal by using various interfaces and lines. By running or executing the software program and/or module stored in the memory 402, and invoking data stored in the memory 402, the processor 408 performs various functions and data processing of the mobile terminal, thereby performing overall monitoring on the mobile terminal. Optionally, the processor 408 may include one or more processor cores. Preferably, the processor 408 may integrate an application processor and a modem processor. The application processor mainly processes an operating system, a user interface, an application program, and the like. The modem processor mainly processes wireless communication. It may be understood that the foregoing modem processor may not be integrated into the processor 408.

The mobile terminal further includes the power supply 409 (such as a battery) for supplying power to the components. Preferably, the power supply may be logically connected to the processor 408 by using a power management system, thereby implementing functions such as charging, discharging, and power consumption management by using the power management system. The power supply 409 may further include one or more of a direct current or alternating current power supply, a re-charging system, a power failure detection circuit, a power supply converter or inverter, a power supply state indicator, and any other components.

Although not shown in the figure, the mobile terminal may further include a camera, a Bluetooth module, and the like. Details are not described herein again. Specifically, in this embodiment, the processor 408 in the mobile terminal loads, into the memory 402 according to the following instructions, executable files corresponding to processes of one or more application programs, and the processor 408 runs the application programs stored in the memory 402 to implement various functions:

obtaining, from a video stream, an image that currently needs to be processed, to obtain a current frame; obtaining coordinates of facial key points in a previous image frame of the current frame, and a confidence level of the coordinates of the facial key points in the previous image frame; calculating coordinates of facial key points in the current frame according to the coordinates of the facial key points in the previous image frame when the confidence level is higher than a preset threshold; and performing multi-face recognition on the current frame according to the coordinates of the facial key points in the current frame, calculating a confidence level of the coordinates of the facial key points in the current frame, and going back to perform the step of obtaining, from a video stream, an image that currently needs to be processed, until recognition on all images in the video stream is completed.

For example, an envelope box of the coordinates of the facial key points in the previous image frame may be calculated when the confidence level is higher than the preset threshold, to obtain a registration coordinate box; and positions of the facial key points in the current frame may be calculated according to the registration coordinate box, to obtain the coordinates of the facial key points in the current frame.

Optionally, to improve recognition accuracy, a face in the current frame may be further detected asynchronously by using an idle computing resource, and the face may be recognized by combining a detection result with the registration coordinate box. That is, the application program stored in the memory 402 may further implement the following function:

detecting a face position in the current frame when determining that a capacity of current idle computing resources is greater than a specified threshold, to obtain a detection coordinate box; and combining the registration coordinate box with the detection coordinate box, to obtain a target coordinate box, and calculating the positions of the facial key points in the current frame according to the target coordinate box, to obtain the coordinates of the facial key points in the current frame.

For example, an overlap rate between each registration coordinate box and each detection coordinate box may be calculated; and the registration coordinate box and the detection coordinate box may be filtered according to the overlap rate, to obtain the target coordinate box.

In addition, the coordinates of the facial key points in the current frame may be obtained through detection if the confidence level of the coordinates of the facial key points in the previous image frame is not higher than the preset threshold, or when the coordinates of the facial key points in the previous image frame of the current frame, and the confidence level cannot be obtained. That is, the application program stored in the memory 402 may further implement the following function:

detecting a face position in the current frame when the confidence level is lower than the preset threshold, or when the coordinates of the facial key points in the previous image frame of the current frame, and the confidence level cannot be obtained, to obtain a detection coordinate box; and calculating the positions of the facial key points in the current frame according to the detection coordinate box, to obtain the coordinates of the facial key points in the current frame.

The preset threshold, the specified threshold, and the specified value may be set according to an actual application requirement, and details are not described herein.

For a specific implementation of each of the foregoing operations, refer to the foregoing embodiments, and details are not described herein again.

It may be learned from the above that, the mobile terminal in this embodiment may obtain coordinates of facial key points in a previous image frame and a confidence level, to deduce coordinates of facial key points in a current frame; and then, perform multi-face recognition on the current frame according to the coordinates of the facial key points in the current frame, and calculate a corresponding confidence level of the current frame, to provide reference for a next image frame. This process is repeated, until recognition on all images in a video stream is completed, to achieve an objective of tracking facial key points in the video stream in real time. In this solution, when the coordinates of the facial key points in the current frame are calculated, refer to a recognition result of the previous frame without performing detection frame by frame. Therefore, compared with an existing solution in which detection needs to be performed frame by frame, a detection time can be greatly reduced to improve processing efficiency, and resource consumption can be reduced. This facilitates real-time calculation by the mobile terminal.

A person of ordinary skill in the art may understand that all or some of the steps of the methods in the foregoing embodiments may be implemented by a program instructing relevant hardware. The program may be stored in a computer-readable storage medium. The storage medium may include: a read-only memory (ROM), a RAM, a magnetic disk, an optical disc, or the like.

An embodiment of the present disclosure further provides a non-volatile computer-readable storage medium, storing a computer program, when being executed by a processor, the program implementing the steps in the foregoing method.

The facial tracking method and apparatus that are provided in the embodiments of the present disclosure are described in detail above. The principle and implementations of the present disclosure are described herein by using specific examples. The descriptions of the embodiments are merely used for helping understand the method and core ideas of the present disclosure. In addition, a person skilled in the art can make variations to the present disclosure in terms of the specific implementations and application scopes according to the ideas of the present disclosure. In conclusion, the content of the specification shall not be construed as a limit to the present disclosure.

What is claimed is:

1. A facial tracking method, performed by a computing terminal, comprising:
   obtaining, by the computing terminal from a video stream, an image that currently needs to be processed as a current image frame;
   obtaining, by the computing terminal, coordinates of facial key points in a previous image frame of the current image frame, and a confidence level of the coordinates of the facial key points in the previous image frame;
   calculating, by the computing terminal, coordinates of facial key points in the current image frame according to the coordinates of the facial key points in the previous image frame when the confidence level is higher than a preset threshold;
   performing, by the computing terminal, multi-face recognition on the current image frame according to the coordinates of the facial key points in the current image frame;
   calculating, by the computing terminal, a confidence level of the coordinates of the facial key points in the current image frame; and
   going back, by the computing terminal, to perform the step of obtaining, from the video stream, an image that currently needs to be processed, until recognition on all image frames in the video stream is completed.

2. The method according to claim 1, wherein the calculating coordinates of facial key points in the current image frame according to the coordinates of the facial key points in the previous image frame comprises:

calculating an envelope box of the coordinates of the facial key points in the previous image frame, to obtain a registration coordinate box; and calculating positions of the facial key points in the current image frame according to the registration coordinate box, to obtain the coordinates of the facial key points in the current image frame.

3. The method according to claim 2, wherein the calculating an envelope box of the coordinates of the facial key points in the previous image frame, to obtain a registration coordinate box comprises:

separately calculating a minimum value and a maximum value in all horizontal coordinates of the coordinates of the facial key points in the previous image frame, to obtain a minimum horizontal coordinate and a maximum horizontal coordinate;

separately calculating a minimum value and a maximum value in all vertical coordinates of the coordinates of the facial key points in the previous image frame, to obtain a minimum vertical coordinate and a maximum vertical coordinate; and calculating the envelope box of the coordinates of the facial key points in the previous image frame according to the minimum horizontal coordinate, the maximum horizontal coordinate, the minimum vertical coordinate, and the maximum vertical coordinate, to obtain the registration coordinate box.

4. The method according to claim 3, wherein the calculating the envelope box of the coordinates of the facial key points in the previous image frame according to the minimum horizontal coordinate, the maximum horizontal coordinate, the minimum vertical coordinate, and the maximum vertical coordinate, to obtain the registration coordinate box comprises:

determining coordinates of a reference point of the envelope box according to one of the minimum horizontal coordinate and the maximum horizontal coordinate and one of the minimum vertical coordinate and the maximum vertical coordinate;

calculating a difference between the maximum horizontal coordinate and the minimum horizontal coordinate, to obtain a width of the envelope box;

calculating a difference between the maximum vertical coordinate and the minimum vertical coordinate, to obtain a height of the envelope box; and drawing the envelope box according to the coordinates of the reference point, the width, and the height, to obtain the registration coordinate box.

5. The method according to claim 4, wherein the determining coordinates of a reference point of the envelope box comprises:

using an upper left corner of the envelope box as the reference point, and using the minimum horizontal coordinate and the maximum vertical coordinate as coordinates of the upper left corner of the envelope box; or using a lower left corner of the envelope box as the reference point, and using the minimum horizontal coordinate and the minimum vertical coordinate as coordinates of the lower left corner of the envelope box; or using an upper right corner of the envelope box as the reference point, and using the maximum horizontal coordinate and the maximum vertical coordinate as coordinates of the upper right corner of the envelope box; or using a lower right corner of the envelope box as the reference point, and using the maximum horizontal coordinate and the minimum vertical coordinate as coordinates of the lower right corner of the envelope box.

6. The method according to claim 1, wherein before the performing multi-face recognition on the current image frame according to the coordinates of the facial key points in the current image frame, the method further comprises:

detecting a face position in the current image frame when the confidence level is lower than or equal to the preset threshold, to obtain a detection coordinate box; and calculating positions of the facial key points in the current image frame according to the detection coordinate box, to obtain the coordinates of the facial key points in the current image frame.

7. The method according to claim 2, wherein before the calculating coordinates of facial key points in the current image frame according to the coordinates of the facial key points in the previous image frame, the method further comprises:

detecting a face position in the current image frame when a capacity of current idle computing resources is greater than a specified threshold, to obtain a detection coordinate box; and the calculating coordinates of facial key points in the current image frame according to the coordinates of the facial key points in the previous image frame comprises: determining a target coordinate box according to the registration coordinate box and the detection coordinate box; and calculating the positions of the facial key points in the current image frame according to the target coordinate box, to obtain the coordinates of the facial key points in the current image frame.

8. The method according to claim 7, wherein the determining a target coordinate box according to the registration coordinate box and the detection coordinate box comprises:

calculating an overlap rate between the registration coordinate box and the detection coordinate box; and filtering the registration coordinate box and the detection coordinate box according to the overlap rate, to obtain the target coordinate box.

9. The method according to claim 8, wherein the filtering the registration coordinate box and the detection coordinate box according to the overlap rate comprises:

deleting the detection coordinate box and determining the registration coordinate box as the target coordinate box, or deleting the registration coordinate box and determining the detection coordinate box as the target coordinate box if the overlap rate is greater than a specified value; and determining both the detection coordinate box and the registration coordinate box as the target coordinate boxes if the overlap rate is less than or equal to a specified value.

10. The method according to claim 1, wherein before the performing multi-face recognition on the current image frame according to the coordinates of the facial key points in the current image frame, the method further comprises:

detecting a face position in the current image frame when the coordinates of the facial key points and the confidence level in the previous image frame o cannot be obtained, to obtain a detection coordinate box; and calculating the positions of the facial key points in the current image frame according to the detection coordinate box, to obtain the coordinates of the facial key points in the current image frame.

11. A facial tracking apparatus, comprising:
one or more memories; and
one or more processors coupled to the one or more processors,
the one or more processors are configured to perform:
obtaining, from a video stream, an image that currently needs to be processed as a current image frame;
obtaining coordinates of facial key points in a previous image frame of the current image frame, and a confidence level of the coordinates of the facial key points in the previous image frame;
calculating coordinates of facial key points in the current image frame according to the coordinates of the facial key points in the previous image frame when the confidence level is higher than a preset threshold;
performing multi-face recognition on the current image frame according to the coordinates of the facial key points in the current image frame;
calculating a confidence level of the coordinates of the facial key points in the current image frame; and
going back to perform the step of obtaining, from a video stream, an image that currently needs to be processed, until recognition on all image frames in the video stream is completed.

12. The apparatus according to claim 11, wherein the calculating coordinates of the facial key points in the current image frame comprises:
calculating an envelope box of the coordinates of the facial key points in the previous image frame when the confidence level is higher than the preset threshold, to obtain a registration coordinate box; and
calculating positions of the facial key points in the current image frame according to the registration coordinate box, to obtain the coordinates of the facial key points in the current image frame.

13. The apparatus according to claim 12, wherein before the calculating coordinates of facial key points in the current image frame according to the coordinates of the facial key points in the previous image frame, the one or more processors are further configured to perform:
detecting a face position in the current image frame when a capacity of current idle computing resources is greater than a specified threshold, to obtain a detection coordinate box; and
the calculating coordinates of facial key points in the current image frame according to the coordinates of the facial key points in the previous image frame comprises: determining a target coordinate box according to the registration coordinate box and the detection coordinate box; and calculating the positions of the facial key points in the current image frame according to the target coordinate box, to obtain the coordinates of the facial key points in the current image frame.

14. The apparatus according to claim 13, wherein the determining a target coordinate box according to the registration coordinate box and the detection coordinate box comprises:
calculating an overlap rate between the registration coordinate box and the detection coordinate box; and
filtering the registration coordinate box and the detection coordinate box according to the overlap rate, to obtain the target coordinate box.

15. The apparatus according to claim 11, wherein before the performing multi-face recognition on the current image frame according to the coordinates of the facial key points in the current image frame, the one or more processors are further configured to perform:
detecting a face position in the current image frame when the confidence level is lower than or equal to the preset threshold, to obtain a detection coordinate box; and
calculating positions of the facial key points in the current image frame according to the detection coordinate box, to obtain the coordinates of the facial key points in the current image frame.

16. The apparatus according to claim 11, wherein before the performing multi-face recognition on the current image frame according to the coordinates of the facial key points in the current image frame, the one or more processors are further configured to perform:
detecting a face position in the current image frame when the coordinates of the facial key points and the confidence level in the previous image frame o cannot be obtained, to obtain a detection coordinate box; and
calculating the positions of the facial key points in the current image frame according to the detection coordinate box, to obtain the coordinates of the facial key points in the current image frame.

17. A non-transitory computer-readable storage medium, storing computer program instructions executable by at least one processor to perform
obtaining, from a video stream, an image that currently needs to be processed as a current image frame;
obtaining coordinates of facial key points in a previous image frame of the current image frame, and a confidence level of the coordinates of the facial key points in the previous image frame;
calculating coordinates of facial key points in the current image frame according to the coordinates of the facial key points in the previous image frame when the confidence level is higher than a preset threshold;
performing multi-face recognition on the current image frame according to the coordinates of the facial key points in the current image frame;
calculating a confidence level of the coordinates of the facial key points in the current image frame; and
going back to perform the step of obtaining, from a video stream, an image that currently needs to be processed, until recognition on all image frames in the video stream is completed.

18. The storage medium according to claim 17, wherein the calculating coordinates of the facial key points in the current image frame comprises:
calculating an envelope box of the coordinates of the facial key points in the previous image frame when the confidence level is higher than the preset threshold, to obtain a registration coordinate box; and
calculating positions of the facial key points in the current image frame according to the registration coordinate box, to obtain the coordinates of the facial key points in the current image frame.

19. The storage medium according to claim 18, wherein before the calculating coordinates of facial key points in the current image frame according to the coordinates of the facial key points in the previous image frame, the computer program instructions further cause the at least one processor to perform:
detecting a face position in the current image frame when a capacity of current idle computing resources is greater than a specified threshold, to obtain a detection coordinate box; and
the calculating coordinates of facial key points in the current image frame according to the coordinates of the facial key points in the previous image frame comprises: determining a target coordinate box according to the registration coordinate box and the detection coordinate box; and calculating the positions of the facial key points in the current image frame according to the target coordinate box, to obtain the coordinates of the facial key points in the current image frame.

20. The storage medium according to claim 19, wherein the determining a target coordinate box according to the registration coordinate box and the detection coordinate box comprises:

calculating an overlap rate between the registration coordinate box and the detection coordinate box; and filtering the registration coordinate box and the detection coordinate box according to the overlap rate, to obtain the target coordinate box.

* * * * *